United States Patent
Akin

(10) Patent No.: US 6,370,492 B1
(45) Date of Patent: Apr. 9, 2002

(54) MODIFIED DESIGN REPRESENTATION FOR FAST FAULT SIMULATION OF AN INTEGRATED CIRCUIT

(75) Inventor: Michelle R. Akin, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/207,878

(22) Filed: Dec. 8, 1998

(51) Int. Cl.[7] .............................. G06F 17/50; G06F 9/45
(52) U.S. Cl. .............................. 703/13; 703/14; 703/20; 703/22; 703/23; 703/27; 714/33
(58) Field of Search ................................ 703/13–17, 20, 703/21, 22, 27, 23; 714/33, 28

(56) References Cited

U.S. PATENT DOCUMENTS

| | | | | |
|---|---|---|---|---|
| 5,146,460 A | * | 9/1992 | Ackerman et al. ............ 714/33 |
| 5,329,471 A | * | 7/1994 | Swoboda et al. ...... 395/500.44 |
| 5,448,496 A | * | 9/1995 | Butts et al. .................. 364/489 |
| 5,452,231 A | * | 9/1995 | Butts et al. .................. 364/489 |
| 5,493,507 A | * | 2/1996 | Shinde et al. ................ 364/489 |
| 5,513,339 A | * | 4/1996 | Agrawal et al. ....... 395/500.36 |
| 5,515,384 A | * | 5/1996 | Horton, III .................. 714/732 |
| 5,557,774 A | * | 9/1996 | Shimabukuro et al. 395/500.42 |
| 5,604,895 A | * | 2/1997 | Raimi .................... 395/500.34 |
| 5,633,812 A | * | 5/1997 | Allen et al. ............ 395/500.36 |
| 5,633,813 A | * | 5/1997 | Srinivasan ............ 395/500.35 |
| 5,684,721 A | * | 11/1997 | Swoboda et al. ........... 364/578 |
| 5,796,990 A | * | 8/1998 | Erle et al. .............. 395/500.05 |
| 5,841,670 A | * | 11/1998 | Swoboda ................ 395/500.44 |
| 5,870,588 A | * | 2/1999 | Rompaey et al. ...... 395/500.34 |
| 5,896,401 A | * | 4/1999 | Abramovici et al. ........ 714/741 |
| 5,949,993 A | * | 9/1999 | Fritz ...................... 395/500.43 |
| 5,999,734 A | * | 12/1999 | Willis et al. ................ 395/706 |
| 6,006,022 A | * | 12/1999 | Rhim et al. ............ 395/500.02 |
| 6,052,524 A | * | 4/2000 | Pauna .................... 395/500.43 |
| 6,086,628 A | * | 7/2000 | Dave et al. ..................... 716/7 |
| 6,110,220 A | * | 8/2000 | Dave et al. ..................... 716/3 |
| 6,117,180 A | * | 9/2000 | Dave et al. ................... 703/20 |

OTHER PUBLICATIONS

"Performing Fault Simulation in Large System Design", Ghosh et al., IEEE 1997.*
"Dependability Evaluation using Hybrid Fault/Error Injectiion", Kanawati et al., IEEE 1995.*

(List continued on next page.)

Primary Examiner—Kevin J. Teska
Assistant Examiner—William Thomson
(74) Attorney, Agent, or Firm—Fitch, Even, Tabin, & Flannery

(57) ABSTRACT

A system and method perform a two-pass fault simulation on an original design representation including a software-modeled design element and a hardware-modeled design element. Logic simulation generates input stimulus for a port on the boundary of the software-modeled design element and the hardware-modeled design element, where such ports are output ports of the software-modeled design element and input ports of the hardware-modeled design element. The input stimulus is merged with test patterns for the original design representation. A modified design representation is generated by replacing the software-modeled design element with a nonfunctional block. Most or all possible faults in the hardware-modeled design representation are seeded. The modified design representation is fault simulated in a first pass using the merged input stimulus and test patterns. Any unseeded faults from the first pass and other possible faults in the software-modeled design representation are then seeded and the original design representation is fault simulated in a second pass. The fault coverage results of the two passes are aggregated to generate an overall fault coverage for the original design representation.

6 Claims, 4 Drawing Sheets

OTHER PUBLICATIONS

"Ferrari: A Tool for The Validation of System Dependability Properties", Kanawati et al., IEEE 1992.*

"Depend: A Design Environment for Prediction and Evaluation of System Dependability", Goswami et al., IEEE 1990.*

"Dependability Analysis in HW–SW Codesign", Csertan et al., IEEE 1995.*

"Software/Hardware Codesign for Validation and Verification", Frank et al., IEEE 1992.*

\* cited by examiner

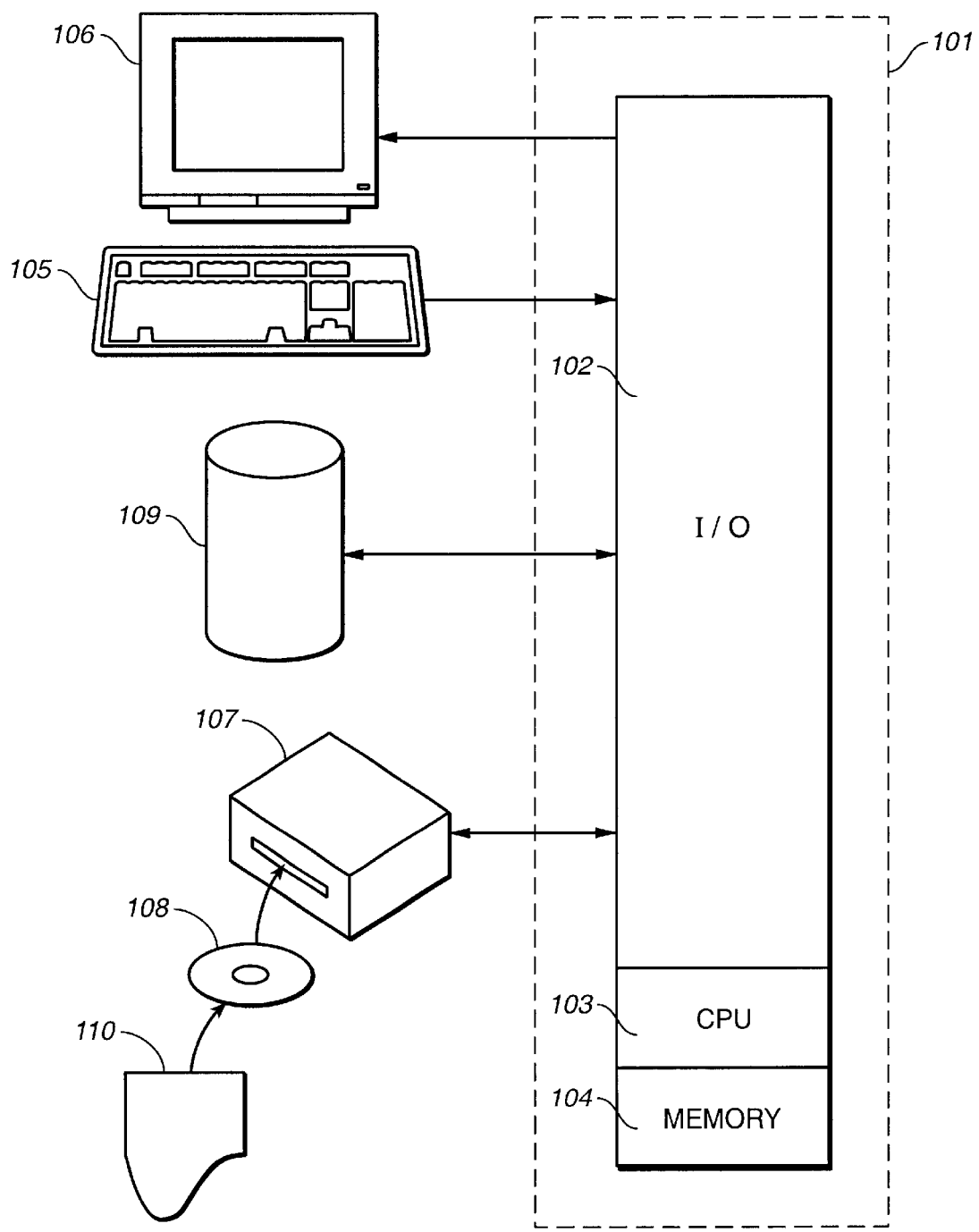
FIG._1

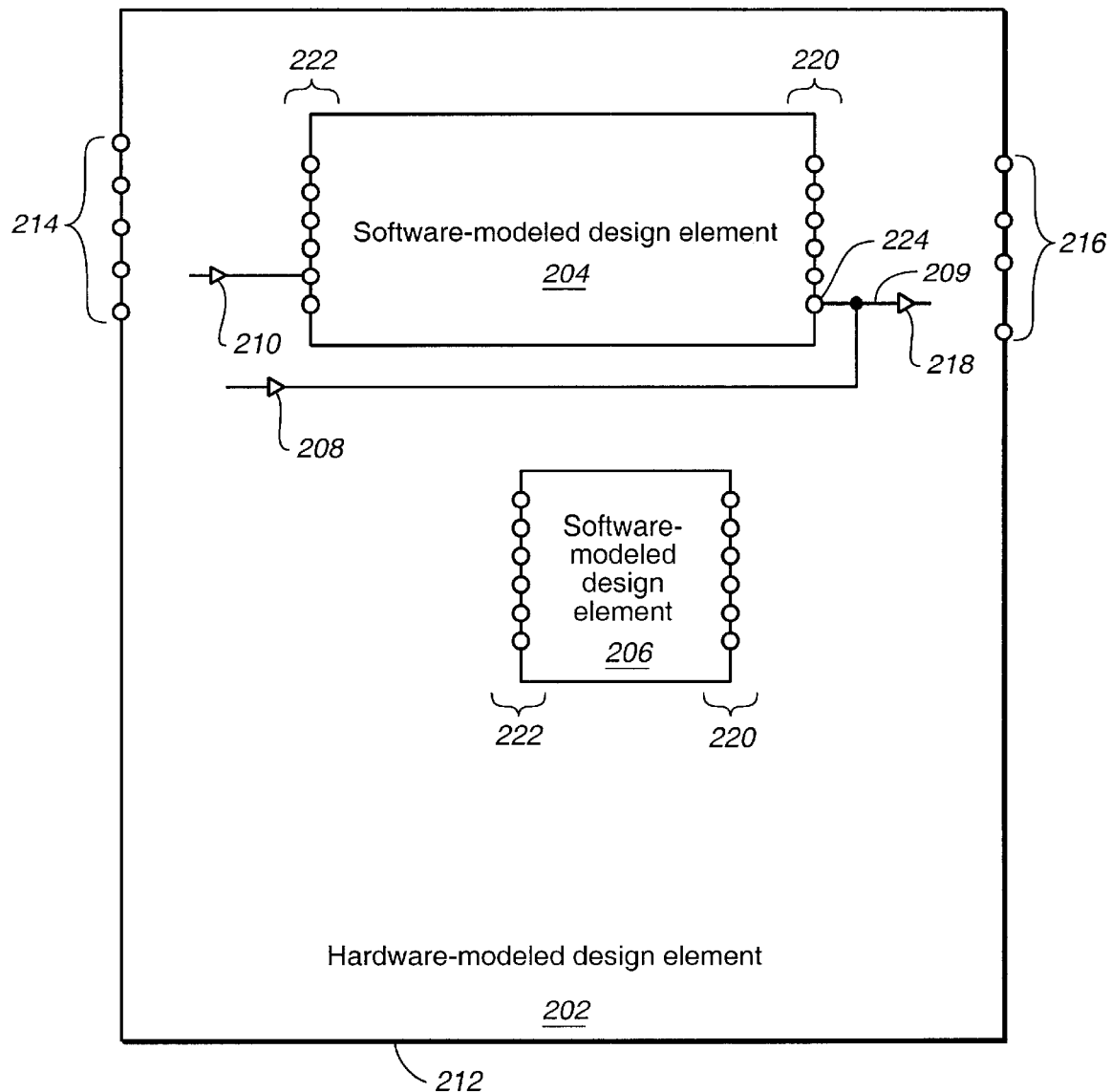
FIG._2

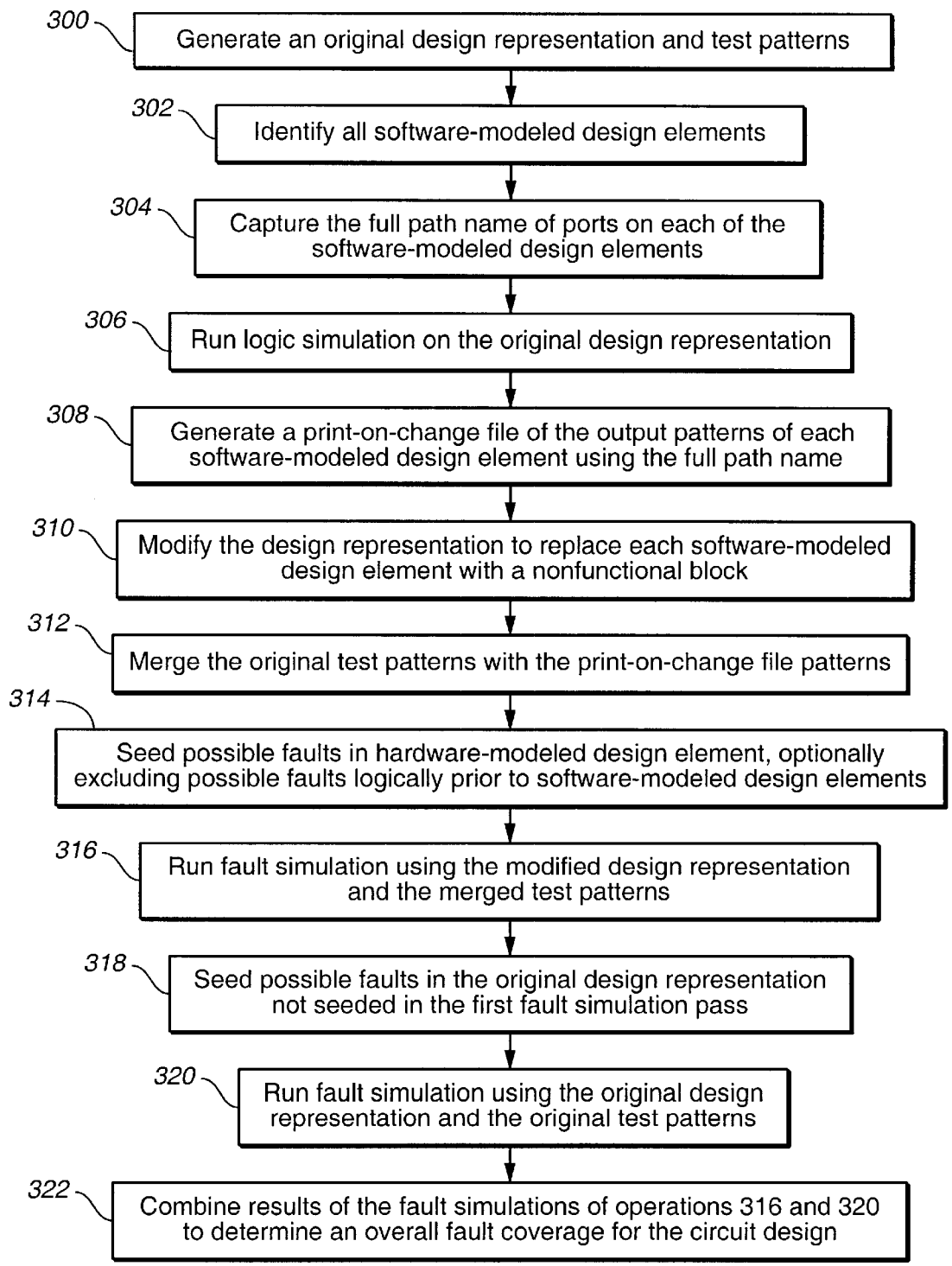
FIG._3

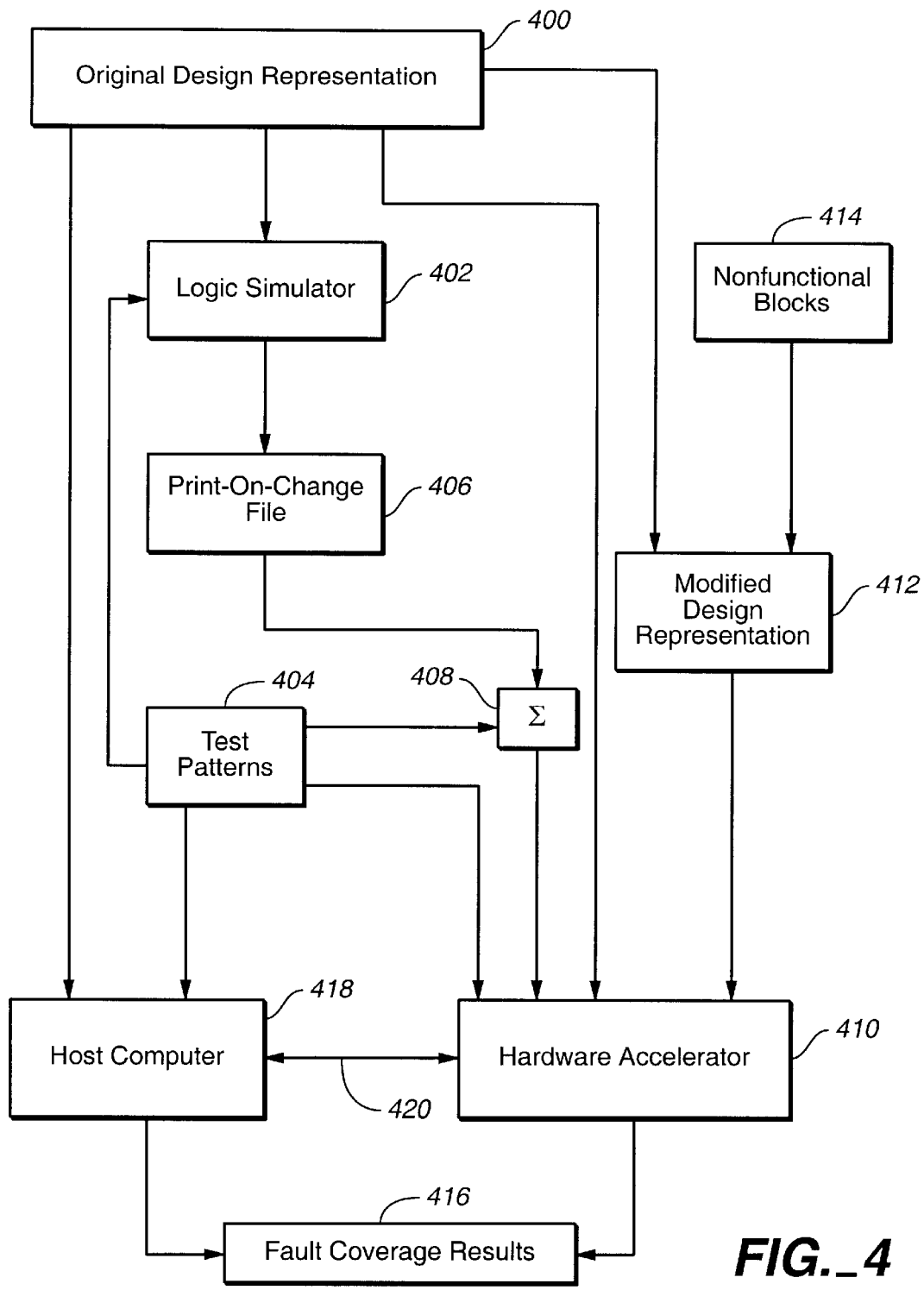
FIG._4

MODIFIED DESIGN REPRESENTATION FOR FAST FAULT SIMULATION OF AN INTEGRATED CIRCUIT

BACKGROUND OF THE INVENTION

1. Field of the Invention

The present invention pertains generally to electrical computers and data processing systems and more particularly to systems and methods for simulation and modeling.

2. Description of Related Art

A modern integrated circuit design and manufacturing process typically involves several stages. A Design stage is an initial phase in which a designer preferably captures a prototype circuit design using schematic design tools or preferably a Hardware Description Language (HDL). The prototype design is eventually recorded in a design representation such as a netlist or a design database. A designer may cycle in and out of the Design stage when guiding a design through multiple design iterations.

A Verification stage is a "testing" phase in which a prototype design is logically tested to ensure that it matches its functional specification, that is, to verify the correctness of the design. Generally, verification involves logic simulation to verify that the circuit: (a) implements what it is supposed to do and (b) does not do what it is not supposed to do. This type of evaluation is typically performed during or immediately after the Design stage and often employs a variety of techniques, including functional verification with the use of an HDL, full logic simulation, and generation of functional test patterns, which represent input stimulus and simulated output results of the design. The designer provides input stimulus, which represents input signals for driving the input ports of the circuit design, to the logic simulation. The designer also typically generates a set of expected results for comparison to the simulated output results of the design. When errors are found, the designer preferably modifies the circuit design, the input stimulus, or the expected results and re-simulates the circuit until the logic simulation results are satisfactory.

During a Manufacturing stage, the design representation is used to generate photolithography masks used in semiconductor fabrication. The fabrication process yields semiconductor wafers in which numerous copies (i.e., chips) of the designed circuit are embedded. Preferably, each chip is rigorously tested in the Chip Testing stage to minimize the possibility of shipping a defective part to a customer.

In preparation for the subsequent Chip Testing stage, a designer typically develops input and output test patterns to be used when physically testing the manufactured chip on an Automated Test Equipment (ATE) system. To properly generate a set of test patterns that adequately tests the manufactured part, the designer performs fault simulations on the circuit design using an evolving set of input stimulus and simulated output results. Fault simulation is used to evaluate a set of test patterns intended to exhaustively exercise the variety of signal paths within the circuit. In this way, the designer can increase the probability of detecting manufacturing, design, or environmental defects (or "faults") in the manufactured circuit. The goal of such exhaustive testing is to increase the probability that only defect-free production chips are packaged and sold to customers.

A fault in an integrated circuit chip can arise from a variety of origins. For example, defects in a fabricated transistor can cause a logic gate to sense a single value at an input port, regardless of the input value actually applied to that input port. This type of defect is termed a "stuck-at" fault, because the input value appears to be stuck at that single value. Other types of faults may include, without limitation, bridging faults, where two or more interconnections are shorted together, or CMOS stuck-open faults, where an electrical path through a p-channel or n-channel transistor of a CMOS logic acts like an open circuit. A designer uses fault simulation techniques to evaluate whether a particular set of test patterns can test substantially all logic paths in the chip for such faults and for other potential defects.

The results of fault simulation are generally an indication of which logic paths in the design were not tested adequately for faults. It is preferable to obtain a fault coverage of over 95% of the logic gates within a design with a set of test patterns. If fault simulation indicates a lower percentage of fault coverage, new test patterns may be added to the set or circuit changes may be implemented (e.g., providing an observable path to otherwise un-testable gates or adding special test circuitry, such as Build-In Self Test (BIST) or boundary scan architectures).

Fault simulation is a resource-intensive type of simulation, particularly when performed exclusively in software. Software-based fault simulation typically employs software-modeled design elements, such as behavioral models, representing portions of the circuit design. Modern fault simulation systems, however, also typically employ hardware acceleration, in which primitive logic gates are implemented in hardware and are used to model portions of the logic gates designed into the circuit. The hardware-modeled design gates operate on input test patterns much faster than a software-based counterpart, thereby greatly reducing the time required to perform the fault simulation.

Complex designs, however, often include logic blocks that are not easily modeled in a hardware accelerator. For example, some logic blocks in a design may not lend themselves to modeling using the primitives available in a hardware accelerator. Furthermore, some designs are so large and complex that the designer does not have enough primitive logic gates available in the hardware accelerator to model the entire design. In this situation, a designer may choose to model portions of the design in hardware and to model the remainder of the design in software using, for example, software-based behavioral models.

Fault simulation systems exist that coordinate the simulation of signal paths in the hardware-modeled portion and the software-modeled portion of the circuit. This coordination, however, typically slows down the simulation because of the increased communications and context switches between the two portions of the hybrid fault simulation (hardware and software). During fault simulation of a large design containing many software-modeled design elements, the communication between the host computer (simulating the software-modeled design element) and the hardware accelerator (simulating the hardware-modeled design element) has been identified as a primary cause of slow simulation speeds. Accordingly, need exists for a method that increases fault simulation speeds by minimizing the impact of such coordination.

SUMMARY OF THE INVENTION

A system and method in accordance with the present invention are useful to improve fault simulation speeds in circuit design representations that include software-modeled design elements and hardware-modeled designed elements.

The present invention, for example, can use multiple fault simulation passes, which in combination can be performed faster than a single fault simulation pass in existing approaches.

It is therefore an advantage of an embodiment of the present invention that fault simulation speed can be improved when a design includes both hardware and software modeled design elements.

It is another advantage of an embodiment of the present invention that a design may be partitioned between hardware-modeled design elements and software-modeled design elements so as to enhance the fault simulation speed increase of a two-pass fault simulation method in accordance with the present invention. Additional objects, advantages, and novel features of the invention are set forth in the description which follows and will become more apparent to those skilled in the art when taken in conjunction with the accompanying drawings. The objects and advantages of the invention may be realized and attained by means of the instrumentalities and accommodations particular pointed out in the appended claims.

To achieve the foregoing and other objects, in accordance with the purposes of the present invention, as embodied and broadly described herein, a system for performing fault simulation on an original design representation including a software-modeled design element and a hardware-modeled design element comprises an output signal pattern for output ports bounding the software-modeled design element; a test pattern for fault simulating the original design representation; a merge module that generates merged input stimulus by merging the output signal pattern with the test pattern; and a modified design representation based on the original design representation including a nonfunctional block replacing the software-modeled design element of the original design representation, the modified design representation being fault simulated using the merged input stimulus.

The present invention may also comprise, in accordance with its objects and purpose, a method comprising the operations of fault simulating in a hardware accelerator a first subset of a possible faults in a hardware-modeled design element of an original design representation; and fault simulating a second subset of the possible faults, including possible faults in a software-modeled design element in said original design representation, the second subset substantially including possible faults not included in the first subset.

BRIEF DESCRIPTION OF THE DRAWINGS

FIG. 1 depicts a general purpose computer in accordance with the present invention.

FIG. 2 depicts an exemplary circuit design including software-modeled design elements and a hardware-modeled design element.

FIG. 3 depicts a flow chart representing an exemplary two-pass fault simulation method in accordance with the present invention.

FIG. 4 depicts an exemplary system embodiment for performing a two-pass fault simulation method in accordance with the present invention.

DETAILED DESCRIPTION OF A PREFERRED EMBODIMENT

One operating environment in which the present invention is potentially useful encompasses the general purpose computer. In such a system, data and program files may be input to the computer, which reads the files and executes the programs therein. Some of the elements of a general purpose computer are shown in FIG. 1, wherein a processor 101 is shown having an input/output (I/O) section 102, a Central Processing Unit (CPU) 103, and a memory section 104. The present invention is optionally implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107. Generally, in contemporary systems, the disk drive unit 107 is a CD-ROM driver unit capable of reading the CD-ROM medium 108, which typically contains programs 110 and data. Computer program products containing mechanisms to effectuate the apparatus and methods in accordance with the present invention may reside in the memory section 104, on a disk storage unit 109, or on the CD-ROM medium 108 of such a system. Alternatively, disk drive unit 107 may be replaced or supplemented by a floppy drive unit, a tape drive unit, or other storage medium drive unit. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, host system software modules, including a logic simulator, a fault simulator, and one or more tools integrating such simulation tools, may be executed by CPU 103, and test patterns, design representations, and print-on-change files may be stored on disk storage unit 109, disk drive unit 107 or other storage medium units coupled to the system.

FIG. 2 depicts an exemplary circuit design 212 including software-modeled design elements 204 and 206 and a hardware-modeled design element 202. Preferably, the entire circuit design 212 could be modeled in hardware and fault simulated on a hardware accelerator. In more complex designs, however, some portions of the design, such as a memory core, may require behavioral code that is typically fault simulated on a host computer as opposed to a hardware accelerator. Furthermore, while it is sometimes possible to represent the functionality of the software-model design element 204 with gate-level primitives, the primitive count required to do so may be so high that space on the hardware accelerator board becomes an issue. A high primitive count may diminish any gain in fault simulation speed achieved by the elimination of the software-modeled elements. In addition, other considerations, such as the experience level of the designer, project schedules, or software optimizations, may cause a designer to select portions of the design for software-modeling as opposed to hardware-modeling. Accordingly, a hybrid fault simulation (including both hardware-modeled and software-modeled design elements) may be justified by a variety of reasons.

In FIG. 2, the software-modeled design elements 204 and 206 may comprise one or more internal design elements that are modeled in software executed on a host computer system. A behavior model simulated in a host computer system is one example of such software. Likewise, the hardware-model design element 202 may include one or more internal design elements modeled in hardware-based primitives on a hardware accelerator. To simplify the illustration, design elements of each category are combined into individual blocks 202, 206, and 204.

The input ports 214 represent ports or pins on an integrated circuit device configured to receive external input signals to drive internal logic. As illustrated, each of the input ports 214 are coupled to the hardware-modeled design element 202; however, external input ports such as ports 214 may also be coupled to directly drive ports of the software-modeled design elements 204 or 206. Likewise, external output ports 216 are coupled to drive output signals external to the integrated circuit device. As illustrated, external output ports 216 are coupled to the hardware-modeled design element 202; however, such ports may also be coupled to be directly driven by port of the software-modeled design elements 204 or 206. Ports 222 represent internal output ports of the hardware-modeled design element 202 and internal input ports of the software-modeled design elements 204 and 206. Ports 220 represent internal input ports of the hardware-modeled design element 202 and internal output ports of the software-modeled design elements 204 and 206. It is also possible to represent bidirectional ports, which can act as both input and output ports. The logic cells 208, 210, and 218 (shown in exemplified form as buffers) will be discussed later in the description of the fault seeding operation.

Generally, fault simulation involves simulating, without faults, a circuit using a set of test patterns to determine the output data of such circuit for each input test pattern. The simulator then injects or seeds a fault at the input of a logic cell within the circuit, repeats the simulation, and compares the "faulted" output data to the "non-faulted" output data to determine which of the input test patterns detected the fault. "Seeding" a fault is typically accomplished with the assistance of the fault simulator system. For example, it is common practice to instruct the fault simulator to seed all logic cell nodes in the design to detect for possible faults, including stuck-at-one and stuck-at-zero faults. Thereafter, the designer typically runs the fault simulation on the entire design or selectively excludes (or "un-seeds") individual logic cell nodes from the fault simulation.

FIG. 3 depicts a flow chart representing a two-pass fault simulation method in accordance with the present invention. Operation 300 generates an original design representation and associated test patterns, which are preferably intended to provide adequate fault coverage for the design representation. The design representation preferably includes at least one software-modeled design element and at least one hardware-modeled design element. It is possible to evaluate a design representation to determine whether fault simulation of the design will benefit from a two-pass fault simulation method in accordance with the present invention. Because the behavioral (i.e., software-modeled) activity is dependent on the test patterns applied during logic simulation, it is typically possible to determine the percentage of behavioral events, as compared to total simulation events (i.e., software and hardware) from a logic simulation summary. Generally, a behavioral event is scheduled when a value change occurs on an input of a logic cell modeled in software, such as by a behavioral model. When using a two-pass fault simulation in accordance with the present invention, test results have shown a fault simulation speed increase (e.g., in kilo-events/second) of two to three times for a circuit design having four to five percent of behavioral events. When evaluating a circuit design, it is also important to note the number of faults that must be excluded during the first pass. The larger number of faults that can be seeded and detected during the first pass, the greater the overall fault simulation speed improvement will be. The designer can use these relationships to evaluate whether a two-pass method would be beneficial for a particular design.

In operation 302, all software-modeled design elements in the design are identified. The manner in which the designer partitions the design representation into the two categories of design elements (i.e., software-modeled or hardware-modeled) can impact the simulation speed improvement realized by a two-pass fault simulation method in accordance with the present invention. Generally, a designer has discretion about whether to model a particular design element in hardware or software. For example, if a memory model consists of both behavioral (i.e., software model) and primitive (i.e., hardware model) design elements, a designer has the option of modeling the entire memory model in software. Typically, if the behavioral portion of the circuit is surrounded by primitives that toggle frequently, it is advantageous to include the highly active primitives as part of the software-modeled design element so that there are fewer events to be captured in the boundary of the software-modeled design element. This approach results in fewer internal events to merge into the test patterns file during the first pass and fewer events to be coordinated between the software simulation on the host system and the hardware simulation in the hardware accelerator in the second pass.

In operation 304, the full path names of the output ports on the boundary of the software-modeled design elements (e.g., 220 of FIG. 2) are extracted. In this operation, the boundary output ports comprise any software-modeled design element port that drives a net connected to a port on a hardware-modeled design element. Another condition may also occur at an output boundary of the software-modeled design element. For example, in FIG. 2, the output signal coupled to port 224 may also be driven by logic cell 208. As a result, the output signal at any particular time may be determined from either port 224 of the software-modeled design element or the output port of logic cell 208, depending on the state of the related circuitry (e.g., depending on which port is actively driving the net or whether all of the ports on the net are in a high-impedance state). The output data on such nets is termed a "resolved signal" to indicate that signal is derived from the state of multiple ports on the net. Accordingly, the output data from such a resolved signal is preferably used to drive the input port to the hardware-modeled design element during the first fault simulation pass.

In operation 306, a logic simulation is performed on the original design representation, on a logic simulation hardware accelerator and/or a software-based logic simulator system, and in operation 308, a print-on-change file is generated from the logic simulation results to contain the output patterns of the output ports 220 for each software modeled element, the output patterns being associated with the full path names to the ports 220.

In operation 310, the design representation is modified to replace each software-modeled design element with a non-functional primitive or some logic block that properly couples the input ports of the software-modeled design element. The original test patterns are merged with the software-modeled design element output data from the logic simulation in operation 312. In operation 314, possible faults in the hardware-modeled design element are seeded. Optionally, the designer may wish to exclude (not seed) certain possible faults from this first fault simulation pass. For example, the possible faults associated with the fan-in path 209 of FIG. 2 may not be detectable in the first fault simulation pass because the simulated output data from the software-modeled design element would mask the fault from detection in the first pass. That is, a fault prior to fan-in path 209 may not propagate to a detectable output, such as ports 216, because the logic-simulated output data may correct (or mask) the fault at the boundary of the software-model design element 204. The same masking effect can occur for the path 210 of FIG. 2. The possible faults that are excluded in the first fault simulation pass are preferably seeded in the second fault simulation pass.

The merged stimulus file of operation 312 is then input in operation 316 to the hardware accelerator to perform a fault simulation on the modified design representation, which contains the hardware-modeled design elements and the nonfunctional replacements of the software-modeled design elements. The results of the first fault simulation pass of operation 316 form a portion of the aggregate fault simulation coverage of this two-pass method.

In operation 318, possible faults not seeded in the first fault simulation are preferably seeded in the original design representation, which is then input to the fault simulator for a second fault simulation pass in operation 320 using the original test patterns. The results of the second fault simulation pass of operation 322 are combined with the results of the first fault simulation pass to form the aggregate fault simulation coverage of this two-pass method. Because a majority of the possible faults were preferably seeded in the first pass, which was substantially performed entirely on the hardware accelerator, the second pass typically involves analysis of fewer possible faults. Accordingly, the second pass preferably does not generally involve significant interprocess activity between the host system and the hardware accelerator.

FIG. 4 depicts an exemplary system embodiment for performing a two-pass fault simulation method in accordance with the present invention. Exemplary elements of a logic simulation pass and two fault simulation passes in accordance with the present invention are illustrated in the block diagram of FIG. 4, which shows the communication between elements of the system and the input and output of data blocks from such elements. The original design representation 400 preferably includes at least one software-modeled design element and at least one hardware-modeled design element. The logic simulator 402 receives the original design representation 400 and test patterns 404 to perform a logic simulation thereon. The print-on-change file 406 or output signal pattern is derived from output signal data generated from the logic simulator 402. Preferably, the print-on-change file 406 includes output signal data from output ports of the software-modeled design elements of the original design representation 400. Generally, the print-on-change file 406 includes only output data for ports that act as input ports to a hardware-modeled design element of original design representation 400, although other combinations or subsets of such data may comprise the print-on-change file 406.

A merge module 408, preferably a portion of an integration tool automating a method of the present invention, merges the data of the print-on-change file 406 and the test patterns 404 to produce a modified input stimulus data set, which is input to the hardware accelerator 410 during a first fault simulation pass. A modified design representation 412 is also input during a first fault simulation pass. The modified design representation 412 comprises portions of the original design representation 400, which has had one or more of the software-modeled design elements replaced with nonfunctional blocks 414. Preferably, all such software-modeled design elements are replaced with nonfunctional blocks 414, however, design and simulation considerations may justify replacement of an incomplete set of such software-modeled design elements.

In the first fault simulation pass, all possible faults within the modified design representation, which is substantially or entirely comprised of hardware-modeled design elements, are preferably seeded. As discussed during the discussion of FIG. 3, some possible faults in the modified design representation 412 may be excluded from the first fault simulation pass because of masking concerns. The result of the first fault simulation pass are output to fault coverage results 416, which may comprise an incremental sum value stores in a memory array or another method of recording fault coverage results.

In a second fault simulation pass, original design representation 400 and original test patterns 404 are input to both host computer 418 and hardware accelerator 410. As such, the second fault simulation pass operates on both hardware-modeled design elements and software-modeled design elements of original design representation 400; however, only a subset of all possible faults are preferably seeded in this pass. For example, in an exemplary embodiment in accordance with the present invention, only those possible faults excluded from the first fault simulation pass and those possible faults located within the software-modeled design elements of original design representation 400 are seeded. In part, because the number of possible faults seeded in the second fault simulation pass are significantly fewer than the total possible faults within the design, this second pass is typically very fast, and the impact of coordination 420 between host computer 418 and hardware accelerator 410 is minimized. The fault coverage results of the second fault simulation pass, output from both the host computer 418 and the hardware accelerator 410, are combined with the fault coverage results of the first fault simulation pass, to constitute an overall fault coverage result for the original design representation 400 and the test patterns 404.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Moreover, while there have been described herein the principles of the present invention in conjunction with specific system and method implementations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly for any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived thereof.

What is claimed is:

1. A method of fault simulation comprising the steps of:
   (a) partitioning an original design representation of an integrated circuit into at least one software-modeled design element and at least one hardware-modeled design element;
   (b) performing a logic simulation on the original design representation with an input test pattern to generate a corresponding output test pattern for the at least one software-modeled design element;
   (c) replacing the at least one software-modeled design element in the original design representation with the corresponding output test pattern to generate a modified design representation for a hardware accelerator;
   (d) seeding a first set of possible faults within the modified design representation wherein faults masked by replacing the at least one software-modeled design element in the original design representation are excluded from the first set of possible faults;
   (e) performing a fault simulation of the modified design representation for the first set of possible faults in the hardware accelerator to generate results for a first fault simulation pass;
   (f) seeding a second set of possible faults in the original design representation wherein the second set of possible faults consists of the faults excluded in step (d);
   (g) performing a fault simulation of the original design representation for the second set of possible faults in both software and the hardware accelerator to generate results for a second fault simulation pass; and
   (h) combining the results of the first fault simulation pass with the results of the second fault simulation pass to generate an aggregate fault simulation coverage of the original design representation.

2. The method of claim 1 wherein step (a) comprises incorporating in the at least one software-modeled design element logic primitives that toggle frequently in the original design representation to reduce a number of events to be captured in a boundary of the at least one software-modeled design element.

3. The method of claim 1 further comprising driving an input port of the at least one hardware-modeled design element with output data from a resolved signal.

4. A computer program product comprising:
   a medium for embodying a computer program for input to a computer; and
   a computer program embodied in the medium for causing the computer to perform the following functions:
      (a) partitioning an original design representation of an integrated circuit into at least one software-modeled design element and at least one hardware-modeled design element;
      (b) performing a logic simulation on the original design representation with an input test pattern to generate a corresponding output test pattern for the at least one software-modeled design element;
      (c) replacing the at least one software-modeled design element in the original design representation with the corresponding output test pattern to generate a modified design representation for a hardware accelerator;
      (d) seeding a first set of possible faults within the modified design representation wherein faults masked by replacing the at least one software-modeled design element in the original design representation are excluded from the first set of possible faults;
      (e) performing a fault simulation of the modified design representation for the first set of possible faults in the. hardware accelerator to generate results for a first fault simulation pass;
      (f) seeding a second set of possible faults in the original design representation wherein the second set of possible faults consists of the faults excluded in step (d);
      (g) performing a fault simulation of the original design representation for the second set of possible faults in both software and the hardware accelerator to generate results for a second fault simulation pass; and
      (h) combining the results of the first fault simulation pass with the results of the second fault simulation pass to generate an aggregate fault simulation coverage of the original design representation.

5. The computer program product of claim 4 wherein step (a) comprises incorporating in the at least one software-modeled design element logic primitives that toggle frequently in the original design representation to reduce a number of events to be captured in a boundary of the at least one software-modeled design element.

6. The computer program product of claim 4 further comprising driving an input port of the at least one hardware-modeled design element with output data from a resolved signal.

* * * * *